United States Patent
Jang et al.

(10) Patent No.: US 10,784,704 B2
(45) Date of Patent: Sep. 22, 2020

(54) ON-BOARD CHARGING SYSTEM

(71) Applicants: Hyundai Motor Company, Seoul (KR); Kia Motors Corporation, Seoul (KR)

(72) Inventors: Hui Sung Jang, Suwon-si (KR); Dong Gyun Woo, Suwon-si (KR); Hyun Wook Seong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 391 days.

(21) Appl. No.: 15/835,584

(22) Filed: Dec. 8, 2017

(65) Prior Publication Data

US 2019/0115779 A1    Apr. 18, 2019

(30) Foreign Application Priority Data

Oct. 12, 2017 (KR) .................. 10-2017-0132105

(51) Int. Cl.
| | |
|---|---|
| H02J 7/04 | (2006.01) |
| H02J 7/02 | (2016.01) |
| H02J 7/06 | (2006.01) |
| H02M 1/42 | (2007.01) |
| H02M 3/335 | (2006.01) |
| H02M 1/00 | (2006.01) |

(Continued)

(52) U.S. Cl.
CPC ............... *H02J 7/022* (2013.01); *H02J 7/06* (2013.01); *H02M 1/4208* (2013.01); *H02M 3/33576* (2013.01); *H02J 7/0072* (2013.01); *H02M 1/4225* (2013.01); *H02M 3/285* (2013.01); *H02M 2001/007* (2013.01)

(58) Field of Classification Search
CPC .............. H02J 7/022; H02J 7/0093; H02J 2007/0059; H02J 7/0068; H01M 10/44
See application file for complete search history.

(56) References Cited

U.S. PATENT DOCUMENTS

| | | | | |
|---|---|---|---|---|
| 5,578,911 | A * | 11/1996 | Carter | ...................... B60L 7/16 |
| | | | | 318/376 |
| 2010/0244775 | A1 * | 9/2010 | Smith | .................. H02M 7/797 |
| | | | | 320/140 |

(Continued)

FOREIGN PATENT DOCUMENTS

| | | |
|---|---|---|
| KR | 20130090678 A | 8/2013 |
| KR | 20140084369 A | 7/2014 |

*Primary Examiner* — Arun C Williams
(74) *Attorney, Agent, or Firm* — Slater Matsil, LLP (57) ABSTRACT

Disclosed is an on-board charging system in which, when a plurality of charging circuits is connected in parallel between input and output terminals, operation timings of switching circuits in the respective charging circuits are interlocked to minimize ripples of an input alternating current. The on-board charging system includes: a plurality of charging circuits configured to each have a power factor correction circuit portion for correcting a power factor of alternating current input power by pulse width modulation control of a switching element and to be connected in parallel with each other between an input terminal of the AC input power and an output terminal connected to an object to be charged; and a controller configured to interlock the switching elements to generate a PWM control signal for performing PWM control.

20 Claims, 6 Drawing Sheets

(51) Int. Cl.
*H02M 3/28* (2006.01)
*H02J 7/00* (2006.01)

(56) References Cited

U.S. PATENT DOCUMENTS

| | | | |
|---|---|---|---|
| 2011/0221363 A1* | 9/2011 | De Sousa | B60L 15/007 318/139 |
| 2012/0112720 A1* | 5/2012 | Remmert | H02M 3/28 323/283 |
| 2013/0271077 A1 | 10/2013 | Kim et al. | |
| 2015/0138856 A1* | 5/2015 | Huynh | H02M 1/4225 363/84 |
| 2015/0229235 A1* | 8/2015 | Underhill | H02M 1/4216 363/89 |

\* cited by examiner

ON-BOARD CHARGING SYSTEM

CROSS-REFERENCE TO RELATED APPLICATIONS

This application claims priority to Korean Patent Application No. 10-2017-0132105, filed on Oct. 12, 2017, which application is hereby incorporated herein by reference.

TECHNICAL FIELD

The present invention relates to an on-board charging system.

BACKGROUND

An electric vehicle or a plug-in hybrid vehicle has a charger that receives alternating current (AC) power from an external power supply facility and converts the AC power into direct current (DC) power to charge an energy storage device such as a battery in a vehicle.

The charger used in such vehicles generally includes a power factor correction circuit for improving the power factor of AC power and a DC-DC conversion circuit for converting a voltage level of an output of the power factor correction circuit into a level of a charging voltage of a battery which is an energy storage device. A capacitor that forms a DC link may be provided at a connection terminal of the power factor correction circuit and the DC-DC conversion circuit. Here, a topology of a boost converter that increases the voltage level by performing pulse width modulation (PWM) control on a switching element may be generally applied to the power factor correction circuit.

Meanwhile, in order to reduce the size and improve the output density, a plurality of chargers composed of the power factor correction circuit and the DC-DC conversion circuit described above is provided and connected in parallel with each other.

In a charging system in which the plurality of such chargers is connected in parallel, the switching elements in the power factor correction circuit of each charger are individually controlled. As the switching elements in the power factor correction circuit of each charger are individually controlled, ripples of an input AC of the charging system affected by the switching of each switching element are amplified by mutual interference. Further, as the ripples of the input AC are amplified, harmonics are generated so that performance related to a distortion rate is lowered due to the generation of harmonics and noise is increased.

It should be understood that the foregoing description of the background art is merely for the purpose of promoting an understanding of the background of the present invention and is not to be construed as an admission that the description corresponds to the prior art known to those skilled in the art.

SUMMARY

The present invention has been made in order to solve the above-mentioned problems in the prior art and an aspect of the present invention is to provide an on-board charging system in which, when a plurality of charging circuits is connected in parallel between input and output terminals, operation timings of switching circuits in the respective charging circuits are interlocked to minimize ripples of an input alternating current (AC).

In accordance with an aspect of the present invention, there is provided an on-board charging system including: a plurality of charging circuits configured to each have a power factor correction circuit portion for correcting a power factor of alternating current (AC) input power by pulse width modulation (PWM) control of a switching element and to be connected in parallel with each other between an input terminal of the AC input power and an output terminal connected to an object to be charged; and a controller configured to interlock the switching elements to generate a PWM control signal for performing PWM control.

Here, when the number of the charging circuits operated to provide charging power to the output terminal among the plurality of charging circuits is n (n being an integer of 2 or larger), the controller may generate the plurality of PWM control signals sequentially having a phase difference of "360 degrees/n".

Also, the controller may include a voltage/current control unit configured to determine a duty ratio of the switching element so that an output voltage sensing value obtained by detecting an output voltage of the power factor correction circuit portion complies with a predetermined output voltage command value, a parallel charging circuit driving determination unit configured to determine the charging circuit operated to provide the charging power to the output terminal among the plurality of charging circuits, a reference signal generation unit configured to generate a reference signal that is a pulse signal of which the duty ratio is determined based on the number of the charging circuits to be operated determined by the parallel charging circuit driving determination unit, and a gate signal generation unit configured to generate the plurality of PWM control signals which has the same frequency as that of the reference signal, has the duty ratio determined by the voltage/current control unit, and is synchronized with one time point of the reference signal.

Also, the gate signal generation unit may synchronize a center of the PWM control signal with a center of on-duty of the reference signal, a rising edge of the reference signal, or a falling edge of the reference signal.

In accordance with another aspect of the present invention, there is provided an on-board charging system including: a first charging circuit configured to have a power factor correction circuit portion for correcting a power factor of AC input power by PWM control of a first switching element; a second charging circuit configured to have a power factor correction circuit portion for correcting a power factor of AC input power by PWM control of a second switching element; a third charging circuit configured to have a power factor correction circuit portion for correcting a power factor of AC input power by PWM control of a third switching element; and a controller configured to interlock the switching elements included in the plurality of charging circuits to generate a PWM control signal for performing PWM control, wherein the first to the third charging circuits are connected in parallel with each other between an input terminal to which the AC input power is applied and an output terminal to which an object to be charged is connected.

Here, when the number of charging circuits operated to provide charging power to the output terminal among the first to the third charging circuits is 3, the controller may respectively provide first to third PWM control signals sequentially having a phase difference of 120 degrees, to the first to the third switching elements.

Also, when the number of charging circuits operated to provide charging power to the output terminal among the first to the third charging circuits is 2, the controller may respectively provide two PWM control signals having a phase difference of 180 degrees, to the switching element in the operated charging circuit.

Also, the controller may include a voltage/current control unit configured to determine duty ratios of the first to the third switching elements so that an output voltage sensing value obtained by detecting an output voltage of the power factor correction circuit portion in each of the first to the third charging circuits complies with a predetermined output voltage command value, a parallel charging circuit driving determination unit configured to determine the charging circuit operated to provide the charging power to the output terminal among the first to the third charging circuits, a reference signal generation unit configured to generate a reference signal that is a pulse signal of which the duty ratio is determined based on the charging circuit to be operated determined by the parallel charging circuit driving determination unit, and a gate signal generation unit configured to generate the plurality of PWM control signals which has the same frequency as that of the reference signal, has the duty ratio determined by the voltage/current control unit, and is synchronized with a center of on-duty of the reference signal, a rising edge of the reference signal, or a falling edge of the reference signal.

Also, the gate signal generation unit may generate a pulse signal of which a center of on-duty is synchronized with the center of on-duty of the reference signal as the PWM control signal of the first switching element, may generate a pulse signal of which a center of on-duty is synchronized with the falling edge of the reference signal as the PWM control signal of the second switching element, and may generate a pulse signal of which a center of on-duty is synchronized with the rising edge of the reference signal as the PWM control signal of the third switching element.

Also, when the parallel charging circuit driving determination unit determines that the first to the third charging circuits are operated, the reference signal generation unit may output a first reference signal having a preset frequency and a duty ratio of 2/3, and the gate signal generation unit may generate first to third PWM control signals having the same frequency as that of the first reference signal and the duty ratio determined by the voltage/current control unit to respectively provide the generated the PWM control signals to the first to the third switching elements, a center of on-duty of the first PWM control signal may be synchronized with a center of on-duty of the first reference signal, a center of on-duty of the second PWM control signal may be synchronized with a falling edge of the first reference signal, and a center of on-duty of the third PWM control signal may be synchronized with a rising edge of the first reference signal.

Also, when the parallel charging circuit driving determination unit determines that the first and second charging circuits are operated, the reference signal generation unit may output a second reference signal having a preset frequency, having a duty ratio of substantially 1, and exhibiting a rising edge and a falling edge substantially at one time point, the gate signal generation unit may generate first and second PWM control signals having the same frequency as that of the second reference signal and the duty ratio determined by the voltage/current control unit to respectively provide the generated PWM control signals to the first and second switching elements, a center of on-duty of the first PWM control signal may be synchronized with a center of on-duty of the second reference signal, and a center of on-duty of the second PWM control signal may be synchronized with a falling edge of the second reference signal.

Also, when the parallel charging circuit driving determination unit determines that the first and third charging circuits are operated, the reference signal generation unit may output a second reference signal having a preset frequency, having a duty ratio of substantially 1, and exhibiting a rising edge and a falling edge substantially at one time point, the gate signal generation unit may generate first and second PWM control signals having the same frequency as that of the second reference signal and the duty ratio determined by the voltage/current control unit to respectively provide the generated PWM control signals to the first and third switching elements, a center of on-duty of the first PWM control signal may be synchronized with a center of on-duty of the second reference signal, and a center of on-duty of the second PWM control signal may be synchronized with a rising edge of the second reference signal.

Also, when the parallel charging circuit driving determination unit determines that the second and third charging circuits are operated, the reference signal generation unit may output a third reference signal having a preset frequency and a duty ratio of 1/2, and the gate signal generation unit may generate first and second PWM control signals having the same frequency as that of the third reference signal and the duty ratio determined by the voltage/current control unit to respectively provide the generated PWM control signals to the second and third switching elements, a center of on-duty of the first PWM control signal may be synchronized with a falling edge of the third reference signal, and a center of on-duty of the second PWM control signal may be synchronized with a rising edge of the third reference signal.

According to the on-board charging system, a plurality of gate signals for controlling respective switching elements included in a plurality of charging circuits connected in parallel with each other may be generated so as to have a phase difference by evenly dividing the entire phases, by which ripples caused by the switching of the switching elements can be canceled by each other so that ripples generated in an input AC may be minimized. Thereby, it is possible to prevent generation of harmonics of the on-board charging system and deterioration of performance related to a distortion rate resulting from the generation of harmonics, and to suppress noise.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF ILLUSTRATIVE EMBODIMENTS

The present invention relates to an on-board charging system and, more particularly, to an on-board charging system in which, when a plurality of charging circuits is connected in parallel between input and output terminals, operation timings of switching circuits in the respective charging circuits are interlocked to minimize ripples of an input alternating current (AC).

Hereinafter, an on-board charging system according to various embodiments of the present invention will be described in detail with reference to the accompanying drawings.

Figure 1:
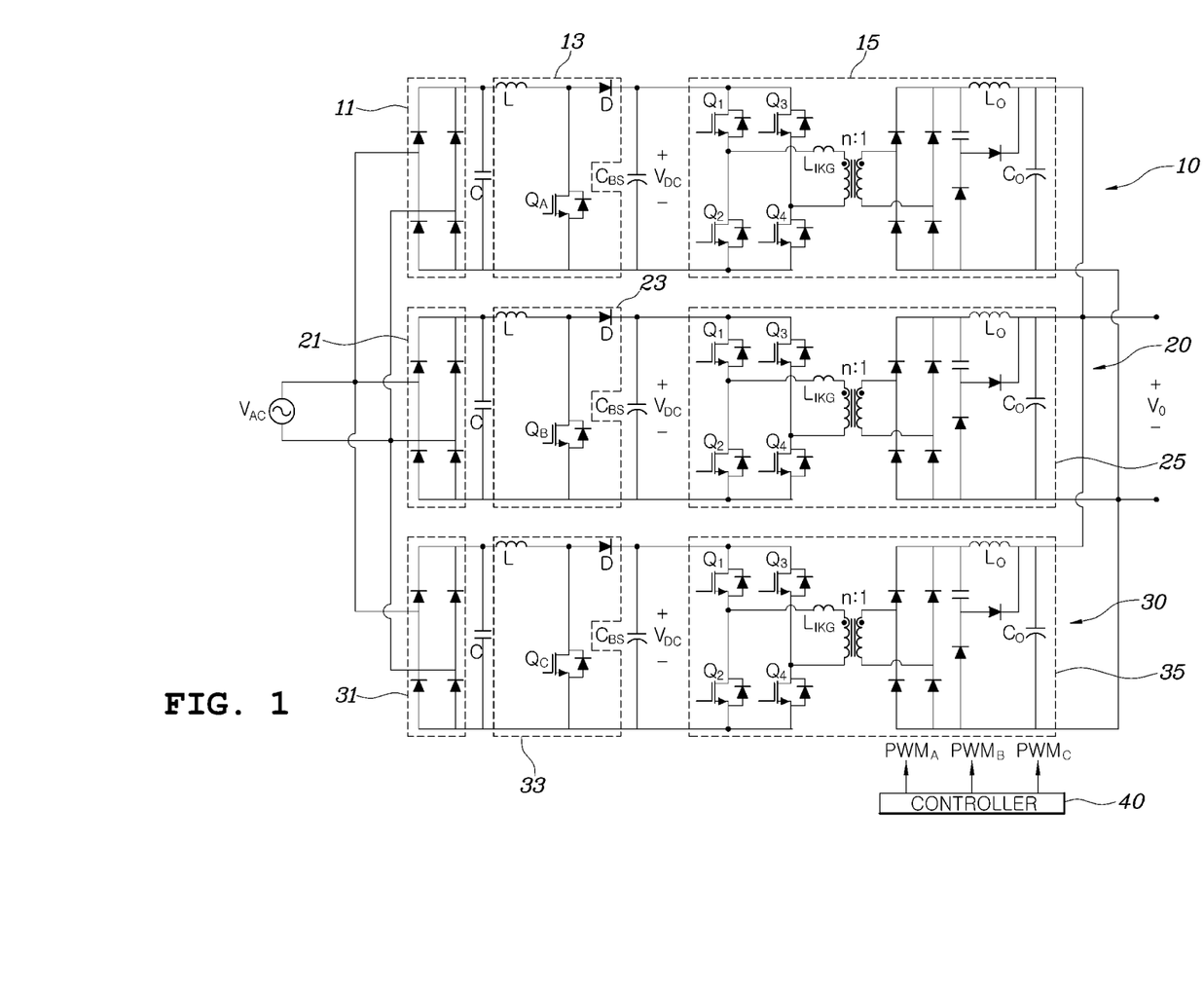
FIG. 1 is a circuit diagram illustrating an on-board charging system according to an embodiment of the present invention.

FIG. 1 is a circuit diagram illustrating an on-board charging system according to an embodiment of the present invention.

As shown in FIG. 1, the on-board charging system according to an embodiment of the present invention may include a plurality of charging circuits 10, 20, and 30, and a controller 40.

Each of the plurality of charging circuits 10, 20, and 30 may be a charging circuit of the type including power factor correction circuit portions 13, 23, and 33 and direct circuit-direct circuit (DC-DC) converters 15, 25, and 35 which are commonly known. In an embodiment of the present invention, the plurality of charging circuits 10, 20, and 30 may be connected in parallel with each other between input and output terminals. That is, an input alternating current (AC) power VAC of the input terminal may be commonly applied to each of the plurality of charging circuits 10, 20, and 30, and each of the plurality of charging circuits 10, 20, and 30 may apply a common output voltage VO to the output terminal.

Although FIG. 1 shows an example in which the three charging circuits 10, 20, and 30 are provided, the number of charging circuits can be variously changed in consideration of various peripheral electrical specifications.

More specifically, the configuration of each charging circuit will be described as follows. In the following description, an example of one charging circuit 10 is described, but the present invention is equally applicable to other charging circuits 20.

The charging circuit 10 may include a rectifying circuit portion 11, a power factor correction circuit portion 13, and a DC-DC converter 15.

The rectifying circuit portion 11 may be implemented in the form of a full bridge wave rectifying circuit composed of a diode to rectify AC input power. A smoothing capacitor C for smoothing electric power to be transmitted may be further provided at the rear end of the rectifying circuit portion 11.

The power factor correction circuit portion 13 is an element for improving the power factor of AC power supplied from an external power supply facility. For example, a topology of a boost converter composed of an inductor L, a switching element QA, and a diode D may be applied to the power factor correction circuit portion 13. That is, as shown in FIG. 1, the power factor correction circuit portion 13 may include the inductor L having one end connected to the rectifying circuit portion 11, the diode D of which an anode is connected to the other end of the inductor and a cathode is connected to one end of a capacitor CBS, and the switching element $Q_1$ for establishing/breaking an electrical connection between a connection terminal of the inductor L and the diode D and the other end of the capacitor CBS.

The DC-DC converter 15 may convert a voltage level of power inputted from the power factor correction circuit portion 13 and may output the converted voltage level at a voltage level suitable for charging of a battery (not shown) to be charged. For example, as shown in FIG. 1, the DC-DC converter 40 may be implemented as a topology of an insulated DC-DC converter circuit including a transformer for electrical insulation between the input and output terminals.

The charging circuits 20 and 30 may also be implemented as substantially the same circuit structure as that of the charging circuit 10. In FIG. 1, reference numerals "21" and "31" denote the rectifying circuit portions, reference numerals "23" and "33" denote the power factor correction circuit portions, and reference numerals "25" and "35" denote the DC-DC converters.

The controller 40 generates control signals PWMA, PWMB, and PWMC for controlling the switching elements QA, QB, and QC provided in the power factor correction circuit portions 13, 23, and 33 of the respective charging circuits 10, 20, and 30, and provides the generated control signals to the switching elements QA, QB, and QC. For example, the control signals PWMA, PWMB, and PWMC are gate signals provided to gates of the switching elements QA, QB, and QC implemented by a field effect transistor, and ON/OFF states of the switching elements QA, QB, and QC can be controlled according to a high-low state of the control signals PWMA, PWMB, and PWMC.

According to an embodiment, when there are at least two charging circuits 10, 20, and 30 used to provide the output of the charging system, the controller 40 interlocks operations of the switching elements QA, QB, and QC in each charging circuit to minimize ripples generated in an input AC.

Figure 2:
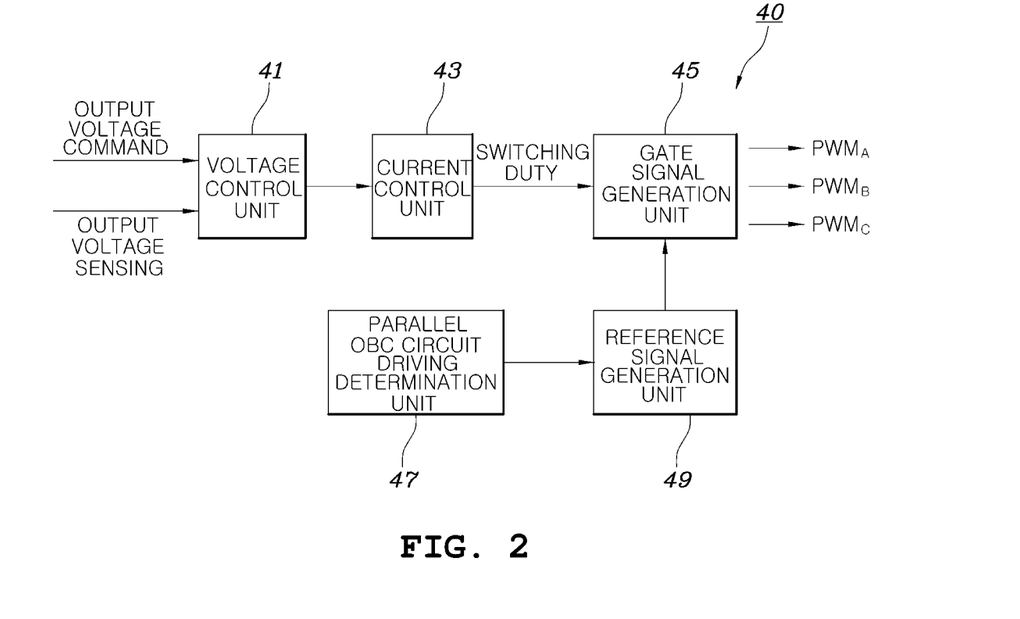
FIG. 2 is a block diagram illustrating a controller of an on-board charging system according to an embodiment of the present invention.

FIG. 2 is a block diagram illustrating a controller of an on-board charging system according to an embodiment of the present invention in more detail.

Referring to FIG. 2, the controller 40 may include a voltage control unit 41, a current control unit 43, a gate signal generation unit 45, a parallel charging circuit driving determination unit 47, and a reference signal generation unit 49.

The voltage control unit 41 may receive an output voltage sensing value obtained by detecting an output voltage of each of the power factor correction circuit portions 13, 23, and 33 in the respective charging circuits 10, 20, and 30 and an output voltage command value that can be preset or input from external other controllers, and may output a current control value that is a command value for a current flowing in the inductor L of each of the power factor correction circuit portions 13, 23, and 33 for reducing an error between the output voltage sensing value and the output voltage command value.

The current control unit 42 may compare the current control value output from the voltage control unit 41 and the current sensing value obtained by detecting the current flowing in the inductor L of each of the power factor correction circuit portions 13, 23, and 33 in the respective charging circuits 10, 20, and 30, and may determine a duty ratio of the switching elements QA, QB, and QC to eliminate the error between the current control value and the current sensing value. The voltage control unit 41 and the current control unit 42 as described above may be provided individually for each of the charging circuits 10, 20, and 30.

The parallel charging circuit driving determination unit 47 may determine a charging circuit used to generate an output power among the plurality of charging circuits 10, 20, and 30. For example, the parallel charging circuit driving determination unit 47 may determine the charging circuit to be appropriately used for charging in consideration of a chargeable capacity of the battery (not shown) charged by the charging system, a preset time required for charging, the cumulative number of times of the operation of each of the charging circuits 10, 20, and 30, and the like. By way of another example, the parallel charging circuit driving determination unit 47 may determine the charging circuit to be used for charging among the plurality of charging circuits 10, 20, and 30 according to instructions of external other controllers or an operator's setting.

The reference signal generation unit 49 outputs a reference signal which is a pulse signal whose duty ratio is determined based on the number of the charging circuits determined to be operated upon charging by the parallel charging circuit driving determination unit 47 and operation setting state. The reference signal generated by the reference signal generation unit 49 may have the same frequency as that of each of the PWM control signals PWMA, PWMB, and PWMC provided to the gates of the switching elements QA, QB and QC.

The gate signal generation unit 45 may generate the PWM control signals PWMA, PWMB, and PWMC having the same frequency as that of the reference signal in conjunction with the reference signal generated by the reference signal generation unit 49 and having the duty ratio determined by the current control unit 42, and may provide the generated control signals to the gates of the switching elements QA, QB and QC.

Hereinafter, the operation of the on-board charging system according to an embodiment of the present invention shown in FIG. 1 will be described in more detail with reference to FIGS. 3 to 6.

Figure 3:
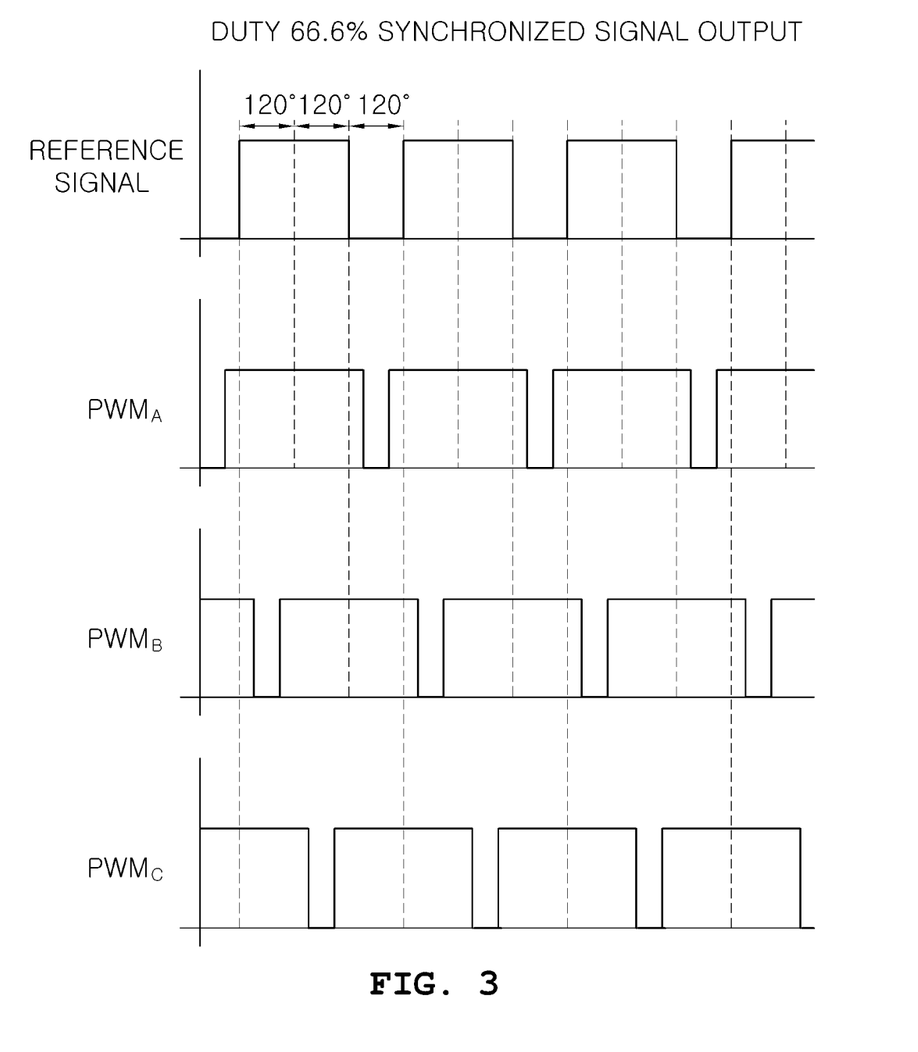
FIGS. 3 to 6 are waveform diagrams illustrating operation examples of a plurality of switching elements included in an on-board charging system according to an embodiment of the present invention.
Figure 4:
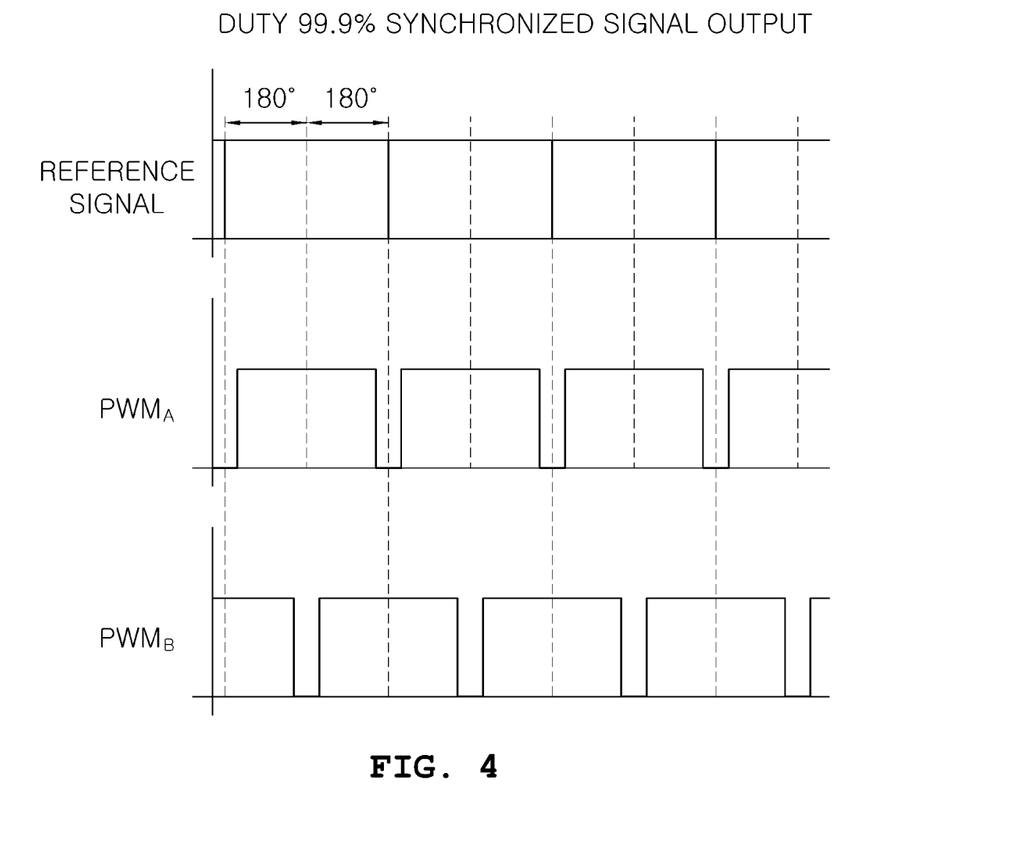
Figure 5:
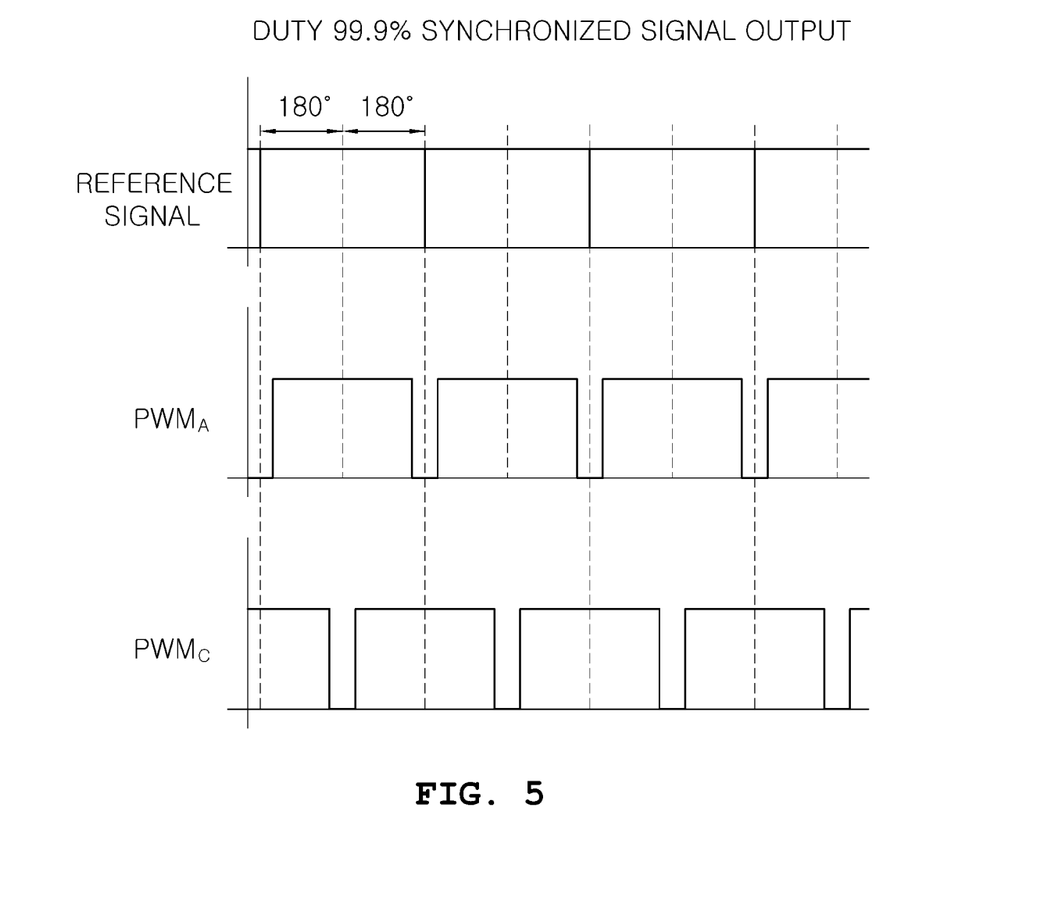
Figure 6:
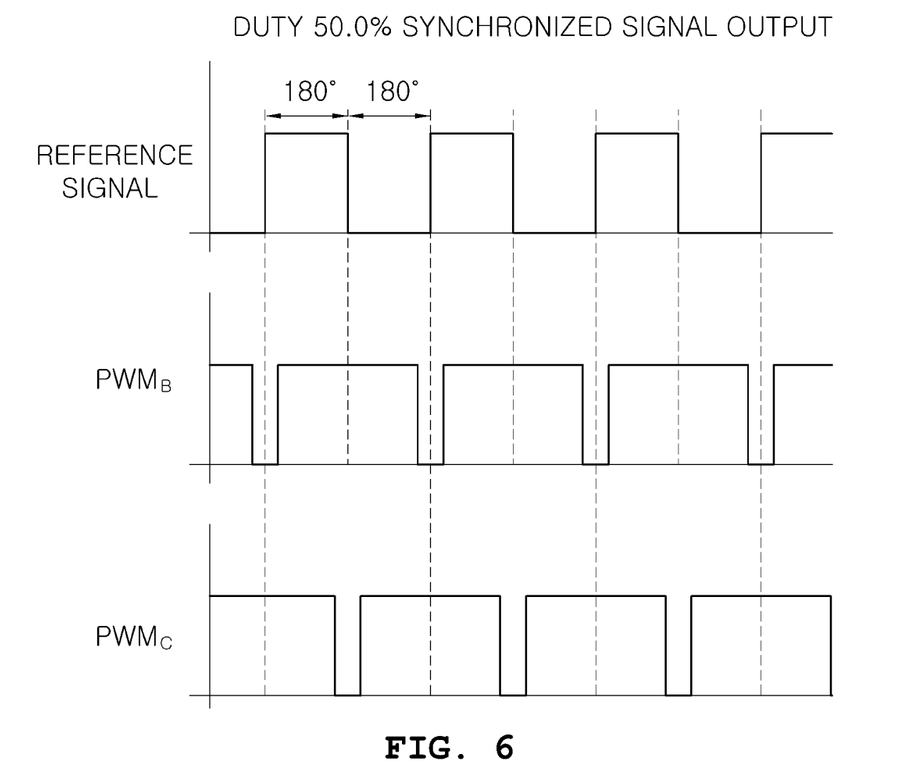

FIGS. 3 to 6 are waveform diagrams illustrating operation examples of a plurality of switching elements included in an on-board charging system according to an embodiment of the present invention. More specifically, FIG. 3 is a waveform diagram illustrating a case in which all the three charging circuits 10, 20, and 30 are operated, FIG. 4 is a waveform diagram illustrating a case in which the two charging circuits 10 and 20 are operated, and FIG. 5 is a waveform diagram illustrating a case in which the two charging circuits 10 and 30 are operated, and FIG. 6 is a waveform diagram illustrating a case in which the two charging circuits 20, and 30 are operated.

First, referring to FIG. 3, an example in which all the three charging circuits 10, 20, and 30 are operated will be described. In this case, the parallel charging circuit driving determination unit 47 transmits, to the reference signal generation unit 49, a signal having information indicating that all the three charging circuits 10, 20, and 30 are determined to be operated, and the reference signal generation unit 49 outputs a reference signal having a preset frequency and a duty ratio of 2/3 (about 66.6%) in response to the transmitted signal.

Next, the gate signal generation unit 45 may generate a first gate signal PWMA having the same frequency as that of the reference signal as a signal (gate signal) for performing PWM control on a first switching element QA included in a first charging circuit 10 and having the duty ratio determined by the current control unit 43, and may synchronize a center of on-duty of the first gate signal PWMA with a center of on-duty of the reference signal to output the synchronized result.

In addition, the gate signal generation unit 45 may generate a second gate signal PWMB having the same frequency as that of the reference signal as a signal (gate signal) for performing PWM control on a second switching element QB included in a second charging circuit 20 and having the duty ratio determined by the current control unit 43, and may synchronize a center of on-duty of the second gate signal PWMB with a falling edge of the reference signal to output the synchronized result.

In addition, the gate signal generation unit 45 may generate a third gate signal PWMc having the same frequency as that of the reference signal as a signal (gate signal) for performing PWM control on a third switching element QC included in a third charging circuit 30 and having the duty ratio determined by the current control unit 43, and may synchronize a center of on-duty of the third gate signal PWMC with a rising edge of the reference signal to output the synchronized result.

By such operation of the gate signal generation unit 45, the gate signals PWMA, PWMB and PWMC, which are the PWM control signals, may be output so as to mutually have a phase difference of 120 degrees. In this manner, the phase difference may be generated by dividing the total phase (360 degrees) by a predetermined ratio according to the number of gate signals, so that ripples due to the switching of the switching elements QA, QB, and QC can be mutually canceled, thereby minimizing ripples generated in the input AC.

Next, an example of generating a PWM control signal for controlling the switching element of each charging circuit when two charging circuits selected from the three charging circuits connected in parallel with each other are adopted will be described with reference to FIGS. 4 to 6.

FIG. 4 shows a case in which the parallel charging circuit driving determination unit 47 determines that the first charging circuit 10 and the second charging circuit 20 are operated. Here, the parallel charging circuit driving determination unit 47 transmits a signal having information about the selected charging circuit to the reference signal generation unit 49, and the reference signal generation unit 49 outputs a reference signal having a preset frequency and a duty ratio of about 99.9% in response to the transmitted signal. This reference signal may substantially correspond to a duty ratio of 1, and may be a pulse signal having a falling edge and a rising edge substantially at the same time point.

The gate signal generation unit 45 may generate the first gate signal PWMA having the same frequency as that of the reference signal as the signal (gate signal) for performing PWM control on the first switching element QA included in the first charging circuit 10 and having the duty ratio determined by the current control unit 43, and may synchronize the center of on-duty of the first gate signal PWMA with the center of on-duty of the reference signal to output the synchronized result.

In addition, the gate signal generation unit 45 may generate the second gate signal PWMB having the same frequency as that of the reference signal as the signal (gate signal) for performing PWM control on the second switching element QB included in the second charging circuit 20 and having the duty ratio determined by the current control unit 43, and may synchronize the center of on-duty of the second gate signal PWMB with the falling edge of the reference signal to output the synchronized result.

By such operation of the gate signal generation unit 45, the gate signals PWMA and PWMB, which are the PWM control signals, may be output so as to mutually have a phase difference of 180 degrees. In this manner, the phase difference may be generated by dividing the total phase (360 degrees) by a predetermined ratio according to the number of gate signals, so that ripples due to the switching of the switching elements QA and QB can be mutually canceled, thereby minimizing ripples generated in the input AC.

FIG. 5 shows a case in which the parallel charging circuit driving determination unit 47 determines that the first charging circuit 10 and the third charging circuit 30 are operated. Here, the parallel charging circuit driving determination unit 47 transmits a signal having information about the selected charging circuit to the reference signal generation unit 49, and the reference signal generation unit 49 outputs a reference signal having a preset frequency and a duty ratio of about 99.9% in response to the transmitted signal. This reference signal may substantially correspond to a duty ratio of 1, and may be a pulse signal having the falling edge and the rising edge substantially at the same time at one time point.

The gate signal generation unit 45 may generate the first gate signal PWMA having the same frequency as that of the reference signal as the signal (gate signal) for performing PWM control on the first switching element QA included in the first charging circuit 10 and having the duty ratio determined by the current control unit 43, and may synchronize the center of on-duty of the first gate signal PWMA with the center of on-duty of the reference signal to output the synchronized result.

In addition, the gate signal generation unit 45 may generate the third gate signal PWMC having the same frequency as that of the reference signal as the signal (gate signal) for performing PWM control on the third switching element QC included in the third charging circuit 30 and having the duty ratio determined by the current control unit 43, and may synchronize the center of on-duty of the third gate signal PWMC with the rising edge of the reference signal to output the synchronized result.

By such operation of the gate signal generation unit 45, the gate signals PWMA and PWMC, which are the PWM control signals, may be output so as to mutually have a phase difference of 180 degrees. In this manner, the phase difference may be generated by dividing the total phase (360 degrees) by a predetermined ratio according to the number of gate signals, so that ripples due to the switching of the switching elements QA and QC can be mutually canceled, thereby minimizing ripples generated in the input AC.

FIG. 6 shows a case in which the parallel charging circuit driving determination unit 47 determines that the second charging circuit 20 and the third charging circuit 30 are operated. Here, the parallel charging circuit driving determination unit 47 transmits a signal having information about the selected charging circuit to the reference signal generation unit 49, and the reference signal generation unit 49 outputs a reference signal having a preset frequency and a duty ratio of 1/2 (50%) in response to the transmitted signal.

The gate signal generation unit 45 may generate the second gate signal PWMB having the same frequency as that of the reference signal as the signal (gate signal) for performing PWM control on the second switching element QB included in the second charging circuit 20 and having the duty ratio determined by the current control unit 43, and may synchronize the center of on-duty of the second gate signal PWMB with the falling edge of the reference signal to output the synchronized result.

In addition, the gate signal generation unit 45 may generate the third gate signal PWMC having the same frequency as that of the reference signal as the signal (gate signal) for performing PWM control on the third switching element QC included in the third charging circuit 30 and having the duty ratio determined by the current control unit 43, and may synchronize the center of on-duty of the third gate signal PWMC with the rising edge of the reference signal to output the synchronized result.

By such operation of the gate signal generation unit 45, the gate signals PWMB and PWMC, which are the PWM control signals, may be output so as to mutually have a phase difference of 180 degrees. In this manner, the phase difference may be generated by dividing the total phase (360 degrees) by a predetermined ratio according to the number of gate signals, so that ripples due to the switching of the switching elements QB and QC can be mutually canceled, thereby minimizing ripples generated in the input AC.

In summary, the controller 40 may generate a phase difference by dividing the entire phase by a predetermined ratio depending on the number of the operated charging circuits while interlocking operations between the switching elements included in the power factor correction circuit portion of each charging circuit depending on the number of the charging circuits operated to output charging power. For example, when it is assumed that the number of charging circuits which are operated to generate charging power is n (n is an integer of 2 or larger), the gate signals of the switching elements included in the respective charging circuits may be sequentially set to have a phase difference of "360 degrees/n".

In particular, when there are provided a total of three charging circuits and two or more of the charging circuits perform the operation of generating the charging power, the reference signal generation unit 49 in the controller 40 may output the reference signals having the duty ratios of about 66.6%, 99.9%, and 50% depending on the number of the operated charging circuits, and may output the gate signal which is synchronized with the center of on-duty of the reference signal, the rising edge of the reference signal, or the falling edge of the reference signal and has the same frequency as that of the reference signal.

As described above, according to the on-board charging system according to various embodiments of the present invention, a plurality of gate signals for controlling respective switching elements included in a plurality of charging circuits connected in parallel with each other may be generated so as to have a phase difference by evenly dividing the entire phases, by which ripples caused by the switching of the switching elements can be canceled each other so that ripples generated in an input AC may be minimized.

Thereby, according to various embodiments of the present invention, it is possible to prevent generation of harmonics of the on-board charging system and deterioration of performance related to a distortion rate resulting from the generation of harmonics, and to suppress the overall noise of the system.

While the invention has been shown and described with respect to particular embodiments thereof, other variations and modifications of the specific embodiments herein shown and described will be apparent to those skilled in the art all within the intended spirit and scope of the invention.

What is claimed is:
1. An on-board charging system comprising:
an input terminal to which an alternating current (AC) input power is applied;
an output terminal to which an object to be charged is connected;
a plurality of charging circuits configured to each have a power factor correction circuit portion for correcting a power factor of the AC power by pulse width modulation (PWM) control of a switching element, and the plurality of charging circuits to be connected in parallel with each other between the input terminal and the output terminal; and a controller configured to generate PWM control signals for PWM-controlling the switching elements by interlocking the switching elements, wherein the controller comprises:
- a voltage/current control unit configured to determine a duty ratio of the switching element so that an output voltage sensing value obtained by detecting an output voltage of the power factor correction circuit portion complies with a predetermined output voltage command value,
- a parallel charging circuit driving determination unit configured to determine the charging circuit operated to provide charging power to the output terminal among the plurality of charging circuits,
- a reference signal generation unit configured to generate a reference signal that is a pulse signal of which the duty ratio is determined based on the number of the charging circuits to be operated determined by the parallel charging circuit driving determination unit, and
- a gate signal generation unit configured to generate the PWM control signals which has the same frequency as that of the reference signal, has the duty ratio determined by the voltage/current control unit, and is synchronized with one time point of the reference signal.

2. The on-board charging system of claim 1, wherein, when the number of the charging circuits operated to provide charging power to the output terminal among the plurality of charging circuits is n (n being an integer of 2 or larger), the controller is configured to generate the PWM control signals sequentially having a phase difference of "360 degrees/n".

3. The on-board charging system of claim 1, wherein the gate signal generation unit is configured to synchronize a center of the PWM control signal with a center of on-duty of the reference signal.

4. An on-board charging system comprising:
- a first charging circuit configured to have a power factor correction circuit portion for correcting a power factor of AC input power by PWM control of a first switching element;
- a second charging circuit configured to have a power factor correction circuit portion for correcting a power factor of AC input power by PWM control of a second switching element;
- a third charging circuit configured to have a power factor correction circuit portion for correcting a power factor of AC input power by PWM control of a third switching element, wherein the first, second and third charging circuits are connected in parallel with each other between an input terminal to which the AC input power is applied and an output terminal to which an object to be charged is connected; and
- a controller configured to interlock the switching elements included in the first, second and third charging circuits to generate a PWM control signal for performing PWM control, wherein the controller comprises:
  - a voltage/current control unit configured to determine duty ratios of the first to the third switching elements so that an output voltage sensing value obtained by detecting an output voltage of the power factor correction circuit portion in each of the first to the third charging circuits complies with a predetermined output voltage command value,
  - a parallel charging circuit driving determination unit configured to determine the charging circuit operated to provide charging power to the output terminal among the first to the third charging circuits,
  - a reference signal generation unit configured to generate a reference signal that is a pulse signal of which the duty ratio is determined based on the charging circuit to be operated determined by the parallel charging circuit driving determination unit, and
  - a gate signal generation unit configured to generate first to third PWM control signals which has the same frequency as that of the reference signal, has the duty ratio determined by the voltage/current control unit, and is synchronized with a center of on-duty of the reference signal, a rising edge of the reference signal, or a falling edge of the reference signal.

5. The on-board charging system of claim 4, wherein, when the number of charging circuits operated to provide charging power to the output terminal among the first to the third charging circuits is 3, the controller is configured to respectively provide first to third PWM control signals sequentially having a phase difference of 120 degrees to the first to the third switching elements.

6. The on-board charging system of claim 4, wherein, when the number of charging circuits operated to provide charging power to the output terminal among the first to the third charging circuits is 2, the controller is configured to respectively provide two PWM control signals having a phase difference of 180 degrees to the switching element in the operated charging circuit.

7. The on-board charging system of claim 4, wherein the gate signal generation unit is configured to:
- generate a pulse signal of which a center of on-duty is synchronized with the center of on-duty of the reference signal as the PWM control signal of the first switching element,
- generate a pulse signal of which a center of on-duty is synchronized with the falling edge of the reference signal as the PWM control signal of the second switching element, and
- generate a pulse signal of which a center of on-duty is synchronized with the rising edge of the reference signal as the PWM control signal of the third switching element.

8. The on-board charging system of claim 4, wherein, when the parallel charging circuit driving determination unit determines that the first to the third charging circuits are operated, the reference signal generation unit is configured to output a first reference signal having a preset frequency and a duty ratio of 2/3, and
the gate signal generation unit is configured to generate the first to third PWM control signals having the same frequency as that of the first reference signal and the duty ratio determined by the voltage/current control unit to respectively provide the generated the PWM control signals to the first to the third switching elements, a center of on-duty of the first PWM control signal is synchronized with a center of on-duty of the first reference signal, a center of on-duty of the second PWM control signal is synchronized with a falling edge of the first reference signal, and a center of on-duty of the third PWM control signal is synchronized with a rising edge of the first reference signal.

9. The on-board charging system of claim 4, wherein, when the parallel charging circuit driving determination unit determines that the first and second charging circuits are operated, the reference signal generation unit is configured to output a second reference signal having a preset frequency, having a duty ratio of substantially 1, and exhibiting a rising edge and a falling edge substantially at one time point, and the gate signal generation unit is configured to generate first and second PWM control signals having the same frequency as that of the second reference signal and the duty ratio determined by the voltage/current control unit to respectively provide the generated PWM control signals to the first and second switching elements, a center of on-duty of the first PWM control signal is synchronized with a center of on-duty of the second reference signal, and a center of on-duty of the second PWM control signal is synchronized with a falling edge of the second reference signal.

10. The on-board charging system of claim 4, wherein, when the parallel charging circuit driving determination unit determines that the first and third charging circuits are operated, the reference signal generation unit is configured to output a second reference signal having a preset frequency, having a duty ratio of substantially 1, and exhibiting a rising edge and a falling edge substantially at one time point, and the gate signal generation unit is configured to generate first and second PWM control signals having the same frequency as that of the second reference signal and the duty ratio determined by the voltage/current control unit to respectively provide the generated PWM control signals to the first and third switching elements, a center of on-duty of the first PWM control signal is synchronized with a center of on-duty of the second reference signal, and a center of on-duty of the second PWM control signal is synchronized with a rising edge of the second reference signal.

11. The on-board charging system of claim 4, wherein, when the parallel charging circuit driving determination unit determines that the second and third charging circuits are operated, the reference signal generation unit is configured to output a third reference signal having a preset frequency and a duty ratio of 1/2, and the gate signal generation unit is configured to generate first and second PWM control signals having the same frequency as that of the third reference signal and the duty ratio determined by the voltage/current control unit to respectively provide the generated PWM control signals to the second and third switching elements, a center of on-duty of the first PWM control signal is synchronized with a falling edge of the third reference signal, and a center of on-duty of the second PWM control signal is synchronized with a rising edge of the third reference signal.

12. An on-board charging system comprising:

n number of charging circuits operable to provide charging power to an output terminal connected to an object to be charged, the n number charging circuits each having a power factor correction circuit portion for correcting a power factor of alternating current (AC) input power by pulse width modulation (PWM) control of a switching element, the n number of charging circuits to be connected in parallel with each other between an input terminal of the AC input power and the output terminal; and a controller configured to generate PWM control signals for PWM-controlling the switching elements by interlocking the switching elements, the generated PWM control signals sequentially having a phase difference of "360 degrees/n", wherein the controller comprises:

a voltage/current control unit configured to determine a duty ratio of the switching element so that an output voltage sensing value obtained by detecting an output voltage of the power factor correction circuit portion complies with a predetermined output voltage command value;

a parallel charging circuit driving determination unit configured to determine charging circuits operated to provide charging power to the output terminal among a plurality of charging circuits, the n number of operable charging circuits being among the plurality of charging circuits, the plurality of charging circuits comprising a first, a second, and a third charging circuit;

a reference signal generation unit configured to generate a reference signal that is a pulse signal of which the duty ratio is determined based on the number of the charging circuits to be operated determined by the parallel charging circuit driving determination unit; and a gate signal generation unit configured to generate a first, a second, and a third PWM control signal which have the same frequency as that of the reference signal, has the duty ratio determined by the voltage/current control unit, and is synchronized with one time point of the reference signal.

13. The on-board charging system of claim 12, wherein n is an integer of 2 or larger.

14. The on-board charging system of claim 12, wherein the gate signal generation unit is configured to synchronize a center of the PWM control signal with a center of on-duty of the reference signal, a rising edge of the reference signal, or a falling edge of the reference signal.

15. The on-board charging system of claim 12, wherein, when the parallel charging circuit driving determination unit determines that the first, the second, and the third charging circuits are operated, the reference signal generation unit is configured to output a first reference signal having a preset frequency and a duty ratio of 2/3, and the gate signal generation unit is configured to generate the PWM control signals having the same frequency as that of the first reference signal and the duty ratio determined by the voltage/current control unit to respectively provide the generated the PWM control signals to the switching elements, a center of on-duty of the first PWM control signal is synchronized with a center of on-duty of the first reference signal, a center of on-duty of the second PWM control signal is synchronized with a falling edge of the first reference signal, and a center of on-duty of the third PWM control signal is synchronized with a rising edge of the first reference signal.

16. The on-board charging system of claim 12, wherein, when the parallel charging circuit driving determination unit determines that the first and the second charging circuits are operated, the reference signal generation unit is configured to output a second reference signal having a preset frequency, having a duty ratio of substantially 1, and exhibiting a rising edge and a falling edge substantially at one time point, and the gate signal generation unit is configured to generate PWM control signals having the same frequency as that of the second reference signal and the duty ratio determined by the voltage/current control unit to respectively provide the generated PWM control signals to a first and second switching elements, a center of on-duty of the first PWM control signal is synchronized with a center of on-duty of the second reference signal, and a center of on-duty of the second PWM control signal is synchronized with a falling edge of the second reference signal.

17. The on-board charging system of claim 12, wherein, when the parallel charging circuit driving determination unit determines that the first and the third charging circuits are operated, the reference signal generation unit is configured to output a second reference signal having a preset frequency, having a duty ratio of substantially 1, and exhibiting a rising edge and a falling edge substantially at one time point, and the gate signal generation unit is configured to generate first and second PWM control signals having the same frequency as that of the second reference signal and the duty ratio determined by the voltage/current control unit to respectively provide the generated PWM control signals to a first and third switching elements, a center of on-duty of the first PWM control signal is synchronized with a center of on-duty of the second reference signal, and a center of on-duty of the second PWM control signal is synchronized with a rising edge of the second reference signal.

18. The on-board charging system of claim 1, wherein the gate signal generation unit is configured to synchronize a center of the PWM control signal with a rising edge of the reference signal.

19. The on-board charging system of claim 1, wherein the gate signal generation unit is configured to synchronize a center of the PWM control signal with a falling edge of the reference signal.

20. The on-board charging system of claim 2, wherein n is equal to 3.

* * * * *